(12) United States Patent
Ribiere et al.

(10) Patent No.: US 8,391,255 B2
(45) Date of Patent: Mar. 5, 2013

(54) CONTENT THROUGHPUT ON WIRELESS MESH NETWORKS

(75) Inventors: Vincent Ribiere, Domaine des Colibris (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 519 days.

(21) Appl. No.: 11/506,169

(22) Filed: Aug. 17, 2006

(65) Prior Publication Data

US 2008/0043638 A1 Feb. 21, 2008

(51) Int. Cl.
*H04W 4/00* (2009.01)
(52) U.S. Cl. ....... 370/338; 370/254; 370/406; 455/41.2; 455/7; 455/11.1; 455/445
(58) Field of Classification Search .................. None
See application file for complete search history.

(56) References Cited

U.S. PATENT DOCUMENTS

| | | | | |
|---|---|---|---|---|
| 7,016,372 B2 * | 3/2006 | Haartsen | | 370/461 |
| 7,164,678 B2 * | 1/2007 | Connor | | 370/392 |
| 7,421,273 B2 * | 9/2008 | Diepstraten et al. | | 455/445 |
| 7,512,132 B2 * | 3/2009 | Haddad | | 370/395.21 |
| 7,558,200 B2 * | 7/2009 | Jain et al. | | 370/230 |
| 7,562,364 B2 * | 7/2009 | Sanjay | | 718/103 |
| 7,668,150 B2 * | 2/2010 | Ofuji et al. | | 370/349 |
| 7,843,819 B1 * | 11/2010 | Benveniste | | 370/230 |
| 7,843,876 B2 * | 11/2010 | Holt et al. | | 370/329 |
| 7,912,066 B2 * | 3/2011 | Limb et al. | | 370/395.41 |
| 2005/0059342 A1 * | 3/2005 | Engels et al. | | 455/7 |
| 2005/0249227 A1 * | 11/2005 | Wang et al. | | 370/412 |
| 2006/0268716 A1 * | 11/2006 | Wijting et al. | | 370/235 |
| 2007/0002740 A1 * | 1/2007 | Evans et al. | | 370/230.1 |
| 2007/0171909 A1 * | 7/2007 | Pignatelli | | 370/392 |
| 2007/0242602 A1 * | 10/2007 | Pang et al. | | 370/216 |
| 2007/0258419 A1 * | 11/2007 | Zhao et al. | | 370/338 |
| 2007/0268127 A1 * | 11/2007 | Rittle et al. | | 340/539.22 |
| 2008/0225737 A1 * | 9/2008 | Gong et al. | | 370/252 |

OTHER PUBLICATIONS

R. Draves, J. Padhye, B. Zill, Routing in Multi-Radio, Multi-hop Wireless Mess Networks, Proceedings of International Conference on Mobile Computing and Networking, MobiCom 2004, Sep. 26, 2004, pp. 114-128, vol. ISBN 1-58113-868-7, No. 04/0009, Publisher: Association for Computing Machinery (ACM) (see portal.acm.org), Published in: New York, NY U.S.

(Continued)

*Primary Examiner* — Willie J Daniel, Jr.
(74) *Attorney, Agent, or Firm* — Brinks Hofer Gilson & Lione

(57) ABSTRACT

In one embodiment, a method includes receiving an inbound data packet over a wireless link at a wireless intermediate network node. The inbound data packet indicates the packet was transmitted by a node at an edge of the mesh. The inbound data packet is associated with a low priority minimum wait interval and a low priority maximum wait interval for reducing contention on the wireless link. An outbound data packet based on the first data packet is transmitted over the wireless link after a wait time. The wait time is based on a high priority minimum wait interval and a high priority maximum wait interval for reducing contention. The low priority minimum wait interval is greater than the high priority minimum wait interval. These techniques allow long packet queues at the edge but quickly clear packets already forwarded by the mesh.

16 Claims, 6 Drawing Sheets

OTHER PUBLICATIONS

S. Jagadeesan, B.S. Manoj, C. Siva Ram Murthy, Interleaved Carrier Sense Multiple Access: An Efficient MAC Protocol for Ad hoc Wireless Networks, Proceedings of International Conference on Communications (ICC), May 11, 2003, pp. 1124-1128, vol. ISBN 0-7803-7802-4, No. 3, Publisher: Institute of Electrical and Electronics Engineers (see www.ieee.org), Published in: New York, NY.

H. Zhang, A. Arora, Y. Choi, M. Gouda, Reliable Bursty Convergecast in Wireless Sensor Networks, Proceedings of the 6th ACM international Symposium on Mobile Ad Hoc Networking and Computing, MobiHoc 2005, May 25, 2005, pp. 266-276, vol. ISBN 1-59593-004-03, Publisher: Association for Computing Machinery (ACM) (see portal.acm.org), Published in: New York, NY.

European Search Report, dated Aug. 16, 2012, European Patent Application No. 07840346.6, European Patent Office, Germany.

Li, Ming et al., MAC Layer Admission Control and Priority Reallocation for Handling QoS Guarantees in Non-cooperative Wireless LANs, dated Dec. 1, 2005, pp. 947-959, vol. 10, No. 6, Mobile Networks and Applications, Kluwer Academic Publishers, The Netherlands.

Iera, Antonio et al., Providing Throughput Guarantees in 802.11e WLAN Through a Dynamic Priority Assignment Mechanism, dated Jul. 1, 2005, pp. 109-125, vol. 34, No. 1-2, Wireless Personal Communications, Kluwer Academic Publishers.

Banchs, Albert et al., Providing Throughput Guarantees in IEEE 802.11e Wireless LANs, dated 2004, pp. 1-10, available at http://www.it.uc3m.es/banchs/papers.

* cited by examiner

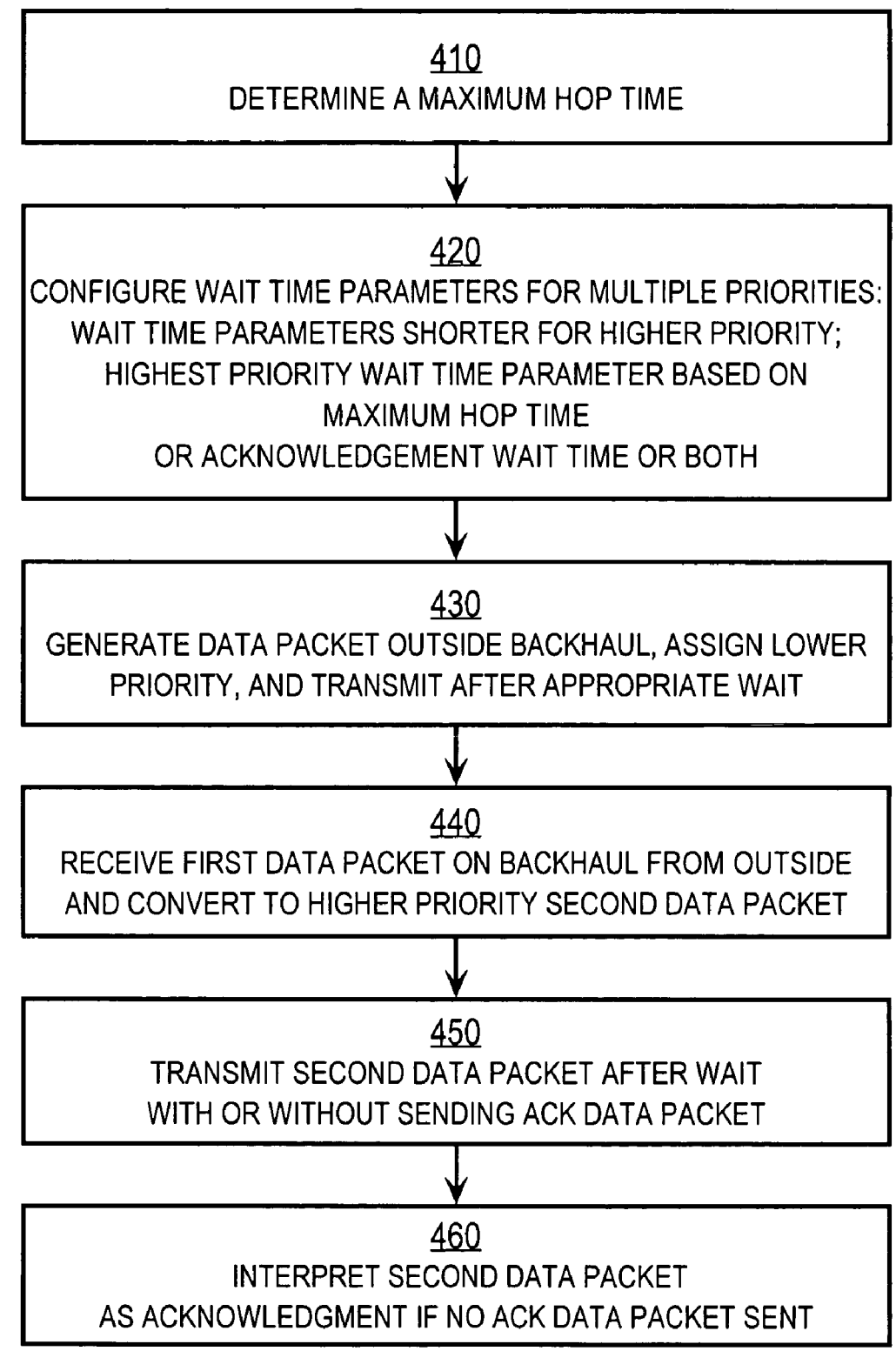

CONTENT THROUGHPUT ON WIRELESS MESH NETWORKS

BACKGROUND OF THE INVENTION

1. Technical Field

The present disclosure relates generally to wireless mesh networks.

2. Background

Networks of general-purpose computer systems and other devices connected by external communication links are well known. The networks often include one or more network devices that facilitate the passage of information between the computer systems and devices. A network node is a network device or computer system connected by the communication links. As used herein, an end node is a network node that is configured to originate or terminate communications over the network. In contrast, an intermediate network node facilitates the passage of data between end nodes. Wireless mesh networks include intermediate network nodes that communicate with each other over wireless links.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates an example method for increasing content throughput on a wireless mesh network;

DETAILED DESCRIPTION OF EXAMPLE EMBODIMENTS

Figure 1:
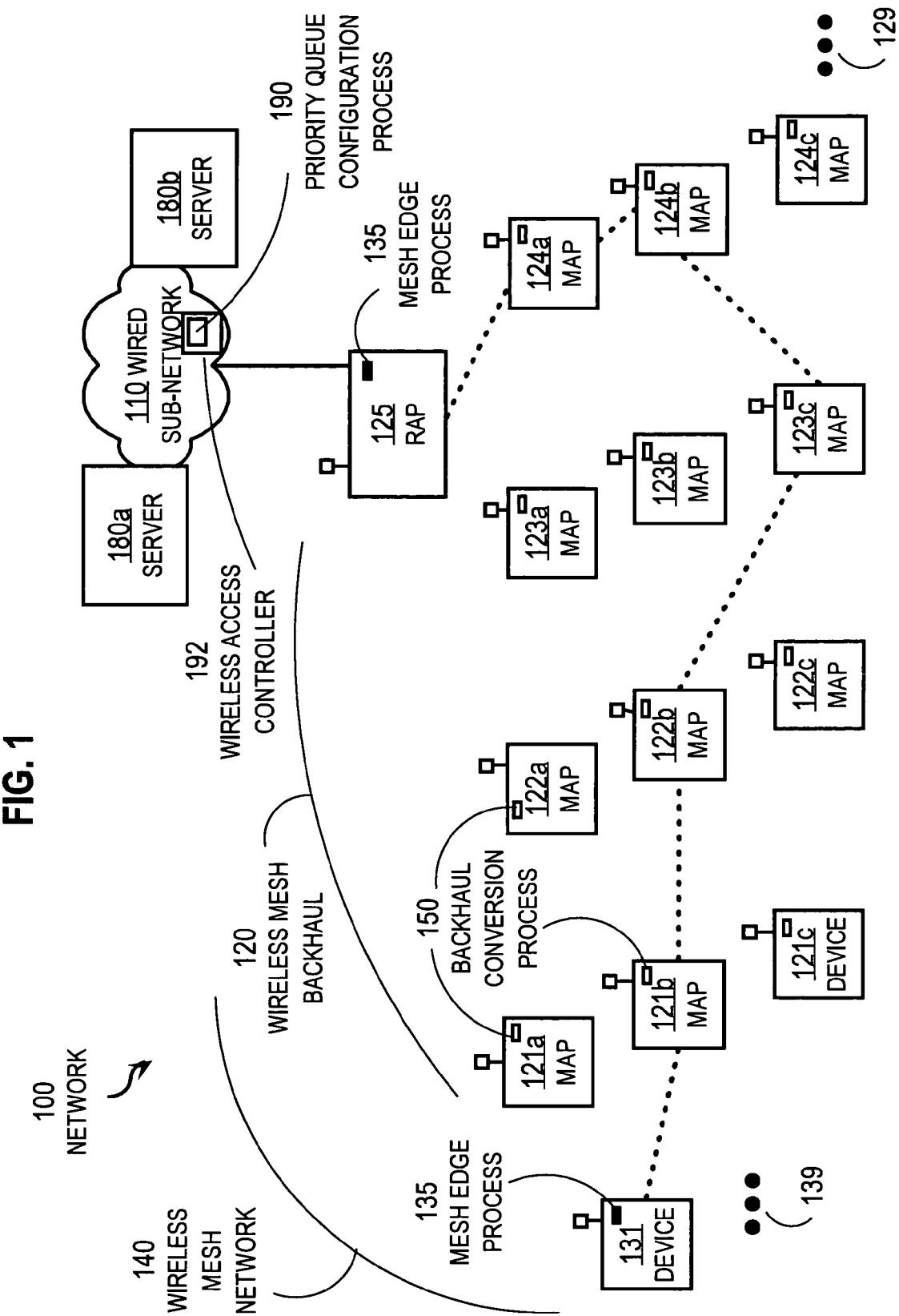
FIG. 1 illustrates an example network that includes an example wireless mesh network.

A method and apparatus are described for transmitting and forwarding data packets in a wireless mesh network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of IEEE standard 802.11 data packets, called 802.11 frames, exchanged among wireless mesh network nodes using a single frequency. However, the invention is not limited to this context. In other embodiments, other wireless protocols, at or above the link layer (layer 2) of the OSI Reference Model, are used with other mesh network nodes that use one or more radio frequencies as one or more channels. The techniques described here apply to one or more of the one or more channels employed by the wireless mesh network.

Overview of Example Wireless Mesh Network

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes on a packet-switched network are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, typically higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header, and some combination of a transport (layer 4) header, a session (layer 5) header, a presentation (layer 6) header and an application (layer 7) header as defined by the Open Systems Interconnection (OSI) Reference Model.

The popularity and good performance of packet switched networks has led to the expanded use of such networks for real time communications to support such applications as telephony, multimedia conferencing, gaming, and other real time shared data applications.

Advances in wireless communication link technology has led to increased use and popularity of wireless intermediate network nodes that serve as access points to a wired network for one or more wireless end nodes. These wireless links employ microwave radio frequencies that have relatively short ranges, on the order of hundreds of meters and less, depending on propagation conditions including interference. A common physical layer (layer 1) and link layer (layer 2) protocol used over these wireless links is the Institute of Electrical and Electronics Engineers (IEEE) standard 802.11, well known in the art. This wireless capability has evolved to stretch the distance from the wired network by deploying multiple wireless access points that communicate with each other using wireless links to form a wireless mesh network backhaul in which only one wireless access point is connected to a wired network. The wireless mesh network includes the backhaul and the wireless end nodes communicating with the backhaul. A published link layer (layer 2) protocol for wireless communications on the wireless mesh backhaul is the IEEE draft 802.11s, also well-known in the art. IEEE standard 802.11 is described in "IEEE 802.11, Wireless LAN Medium Access Control (MAC) and Physical Layer (PHY) specifications," Standard, IEEE, New York, N.Y., August 1999, and in IEEE 802.11 e/D2.0, Part 11: Wireless LAN Medium Access Control (MAC) and Physical Layer (PHY) specifications: Medium Access Control (MAC) Enhancements for Quality of Service (QoS)," Draft Supplement to IEEE 802.11 Standard—1999 Edition, IEEE, New York, N.Y. 2001, the entire contents of each of which are hereby incorporated by reference as if fully set forth herein.

According to the IEEE 802.11e media access control (MAC) link layer protocol, a layer 2 protocol, no node on the wireless mesh may transmit on a particular frequency (called a "channel") used by the mesh network until the channel is observed to be clear of traffic for a time interval based on a configurable parameter called the arbitration inter-frame space (AIFS). When the channel is clear for that time interval, a node can send a data packet. Also according to the IEEE 802.11 MAC protocol, every data packet sent over a wireless link from a transmitting node to a receiving node has to be acknowledged with an acknowledgement data packet sent from the receiving node to the transmitting node within a short time interval determined by a configurable parameter called the short inter-frame space (SIFS). Only after sending the acknowledgement data packet, may the receiving node forward the data packet to the next node. If the acknowledgement data packet is not received in this time, the transmitting node is to retransmit the data packet after waiting another time interval determined by another configurable parameter.

While suitable for resolving contention for a wireless channel in many situations that involve widely spaced or large data packets or very few nodes in the backhaul, this method suffers some disadvantages when a node attempts to send a large stream of short data packets over a mesh backhaul with multiple wireless access points. Such is the case when real time voice or video data is sent over a packet switched network through a large mesh network. Delays are introduced at each node while the receiving node sends the acknowledgement data packet before forwarding the received data packet. The more mesh nodes in the backhaul, the more the cumulative delay. The greater the delay, the greater the chances that an intervening mesh node through which the data packet is to be forwarded has received a data packet from another end node or mesh backhaul node. Thus the node that forwards the first packet must wait until the other packet has been acknowledged and forwarded and the channel has been clear for the requisite time interval before the first data packet can be forwarded to the next node in the mesh. Some waits may exceed the time interval for an acknowledgement of a yet another data packet received by the forwarding node, which causes a transmitting node to retransmit. It is possible that the delays, extra processing at each node and retransmissions can overload the mesh backhaul even to the point of a catastrophic failure in which the wireless mesh network is unable to successfully transmit any data packets across the backhaul.

FIG. 1 illustrates an example network 100 that includes an example wireless mesh network 140 and an example wired subnetwork 110.

The wireless mesh network 140 includes one or more wireless end nodes, such as device 131 and others indicated by ellipsis 139, collectively referenced hereinafter as wireless end nodes 131. A wireless end node 131 is a computer or special purpose device that originates or terminates communications over a wireless link. The wireless mesh network 140 includes a wireless mesh backhaul 120 of one or more wireless intermediate network nodes, such as wireless mesh access point (MAP) 121a, MAP 121b, MAP 121c, MAP 122a, MAP 122b, MAP 122c, MAP 123a, MAP 123b, MAP 123c, MAP 124a, MAP 124b, MAP 124c, and rooftop access point (RAP) 125 and others indicated by ellipsis 129, collectively referenced herein as backhaul nodes 121. Of these backhaul nodes 121, RAP 125 is the only one that is also connected by wire to wired subnetwork 110. In this configuration RAP 125 is called herein a wireless roof top access point (RAP). In various embodiments, zero or more backhaul nodes 121 are stationary or mobile, with one or more radio frequencies configured as one or more channels for communication with each other and with wireless end nodes in range. For convenience, the backhaul nodes 121 and end nodes 131 are collectively called mesh nodes. Mesh nodes that originate a wireless data packet with payloads that contain content independent of the wireless protocol are here called mesh edge nodes. Device 131 and other end nodes 139 are mesh edge nodes that originate traffic to the backhaul 120 for delivery to wireless rooftop access point RAP 125 and subnetwork 110. Likewise, wireless roof top access point, RAP 125, is a mesh edge node that originates wireless traffic based on wired data packets received from subnetwork 110 for delivery to end nodes 131 such as device 131 and other end nodes 139 through backhaul 120.

The wired subnetwork 110 includes or is connected to one or more network nodes (e.g., RAP 125 of wireless mesh network 140). The wired subnetwork 110 includes any network that connects network nodes, including, but not limited to, local area networks (LANs), wide-area networks (WAN), the Internet (a network of heterogeneous networks using the Internet Protocol, IP), and virtual private networks. For the purposes of illustration, wired subnetwork 110 is a wired metropolitan area network.

Network 100 also includes server 180a and server 180b (collectively referenced hereinafter as servers 180) that communicate over wired subnetwork 110. The client-server model of computer process interaction is widely known and used. According to the client-server model, a client process sends a message including a request to a server process, and the server process responds by providing a service. The client and server typically operate at the application layer (layer 7) of the OSI Reference Model. The server process may also return a message with a response to the client process. Often the client process and server process execute on different devices, called hosts, and communicate via a network using one or more lower layer protocols for network communications. The term "server" is conventionally used to refer to the process that provides the service, or the host on which the process operates. Similarly, the term "client" is conventionally used to refer to the process that makes the request, or the host on which the process operates. In addition, the process performed by a server can be broken up to run as multiple processes on multiple hosts (sometimes called tiers) for reasons that include reliability, scalability, and redundancy. As used herein, the terms "client" and "server" refer to the processes, rather than the hosts, unless otherwise clear from the context. Thus servers 180 execute on one or more hosts (not shown) connected to wired subnetwork 110.

Network 100, includes a wireless access controller 192 that configures the wireless mesh backhaul and helps to detect and correct for node or link failure. In some embodiments a Wireless Control Station (WCS) management station serves as the wireless access controller.

As long as a MAP is in range of least one other MAP that is in direct or indirect communication with wireless rooftop access point 125, that MAP is also in communication with the wired subnetwork 110 and servers 180. Any end node 131 in range of a MAP that is in communication with the roof top access point 125 is also in communication with wired subnetwork 110 and servers 180. Although more than one end node 131, 13 backhaul MAPs 120 and two servers 180 are depicted in FIG. 1 for purposes of illustration, in other embodiments more or fewer such components are included in a network.

According to various embodiments of the invention one or more of a modified priority queue configuration process 190 in wireless access controller 192, a backhaul conversion process 150 in one or more backhaul nodes 121 (e.g., in MAP 121a), and a mesh edge process 135 on one or more end nodes 131 (e.g., device 131), are included in network 100 to improve goodput in the backhaul 120 between end nodes 131 and wired subnetwork 110.

Figure 2:
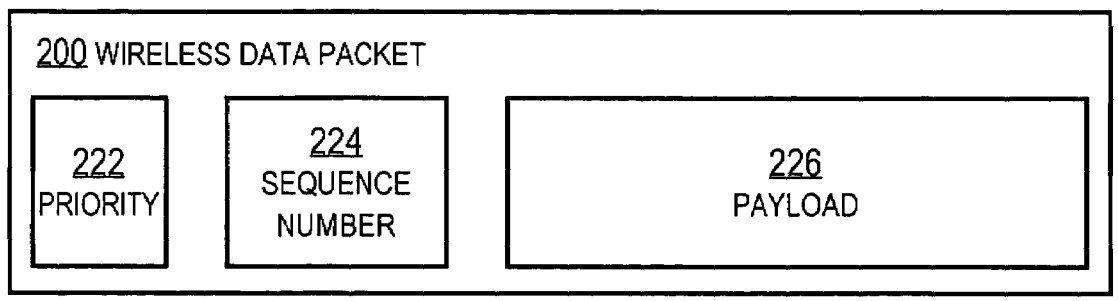
FIG. 2 illustrates an example wireless data packet.

FIG. 2 illustrates an example wireless data packet 200. A wireless data packet 200, such as an IEEE standard 802.11e frame, includes priority field 222, a sequence number field 224 and a data payload field 226, among other fields (not shown). The priority field 222 holds data that indicates a priority for a data packet that carries data. Several different priorities for a data packet can be distinguished. For example, real time data packets, such as data packets carrying voice data, are given a higher priority than data packets, such as carrying email, web pages, and file transfer, which are given a best reasonable effort (also called "best effort" herein). The IEEE standard 802.11e (amendment to standard 802.11) allows for four priorities and distinguishes those using a QoS control field as priority field 222. Data of different priorities are stored in different queues on each mesh node and are forwarded with different values for such wait time parameters as AIFS or SIFS or both.

The sequence number field 224 holds data that uniquely identifies a data packet among a series of packets from a particular source node to a particular destination node. The IEEE draft 802.11s allows for a sequence number field that holds a unique number end-to-end in the mesh, and in some embodiments, this field is the sequence number field 224. The payload field 226 holds data used by a different, typically higher level application according to the OSI Reference Model.

Although fields are shown in FIG. 2 as contiguous portions of data packet 200 in a particular order for purposes of illustration, in other embodiments one or more fields or portions thereof are arranged as more or fewer fields in the same or different order. For example, in various types of 802.11 frames, the data payload field may be reduced to allow more room in the header for one or more additional fields. In some embodiments, one or more portions of the sequence number field 224, as described in more detail below, are in the payload field 226 for the link layer protocol. Furthermore, in the 802.11 standard and 802.11e draft, none of the fields are labeled priority fields. In some embodiments, e.g., in embodiments that use 802.11 frame format with no 802.11e extension, the priority is located in the upper layers of the message (e.g. in the IP header) in payload. In some embodiments, the priority is located in the QoS control field introduced by 802.11e. The type/sub-type in the frame control field tells if QoS is used for this frame.

As described in more detail in a later section, a data packet of a give type is given one priority at the edge of the mesh backhaul, and a different, higher priority, to traverse the backhaul. For properly chosen wait parameters associated with each priority, this approach ensures that a data packet accepted onto a wireless link in the backhaul traverses the entire backhaul before another data packet is accepted onto the backhaul. Waiting packets collect at the edges of the backhaul, where they do not block the transfer of the accepted data packet.

Example Wireless MESH Node

Figure 3:
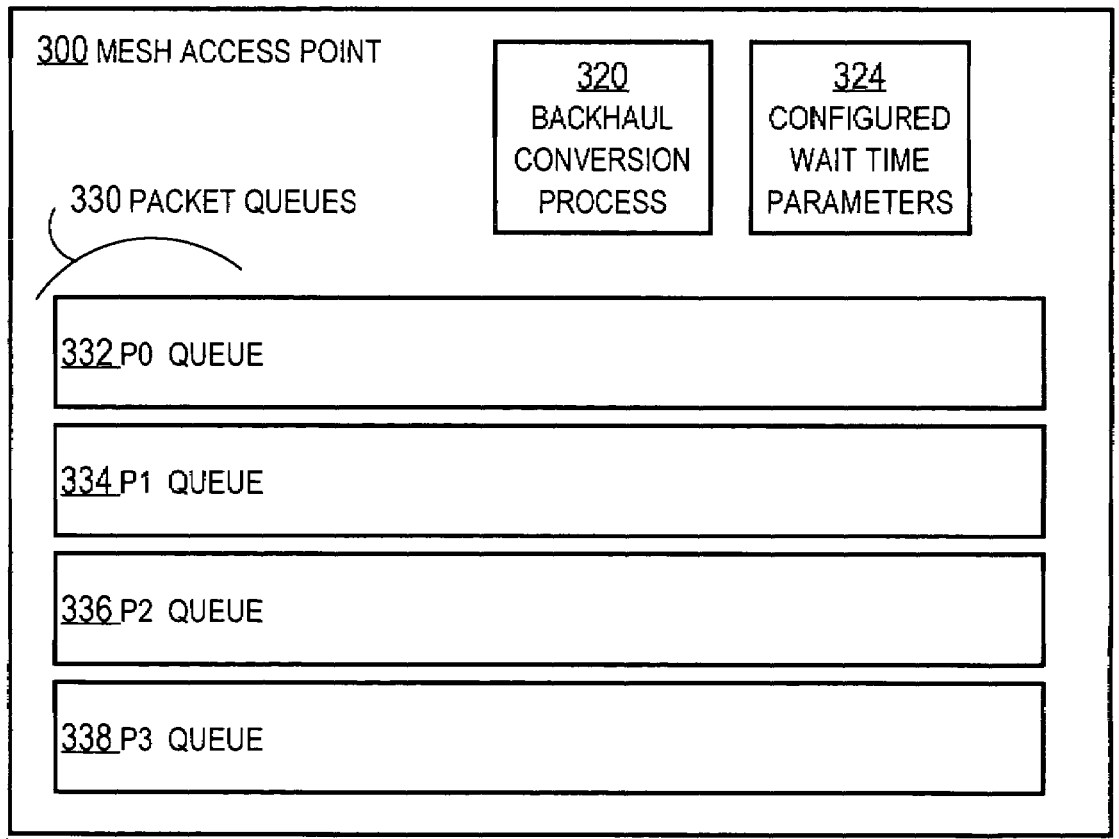
FIG. 3 illustrates an example wireless mesh access point (MAP)

FIG. 3 illustrates an example wireless mesh access point (MAP) 300. The MAP 300 includes packet queues 330 for storing data packets while they wait for an opening on the channel. In the illustrated embodiment, packet queues 330 include four packet queues, queue 332 for packets of priority P0, queue 334 for packets of priority P1, queue 336 for packets of priority P2, and queue 338 for packets of priority P3. In other embodiments, more or fewer queues are included in packet queues 330. Embodiments of the invention are effective with as few as two queues in packet queues 330 associated with two priorities. The IEEE standard 802.11 allows for four queues associated with four priorities. The higher priority gets better access to the wireless link by virtue of wait time parameters associated with the higher priority queues that are shorter than the wait time parameters associated with the lower priority queues.

In the illustrated embodiment, the MAP 300 includes a backhaul conversion process 320 and configured wait time parameters fields 324. The backhaul conversion process 320 executes on one or more processors in MAP 300 and performs the steps described in more detail below with reference to FIG. 4, and FIG. 5B and FIG. 5C. The configured wait time parameters field 324 holds data that indicates wait time parameters associated with each queue, such as values for AIFS and SIFS, for each queue.

Example Methods on the Wireless Mesh

FIG. 4 illustrates an example method for increasing content throughput on a wireless mesh network. Although steps are shown in FIG. 4 and subsequent flow diagrams in a particular order for purposes of illustration, in other embodiments one or more steps are performed in a different order or overlapping in time by one or more processes running in series or parallel on the same or different processors on the same or different hosts, or one or more steps may be omitted, or the methods may be changed in some combination of ways. In an illustrated embodiment steps 410 and 420 are performed by a priority queue process 190 in a WCS server. Steps 430 and 460 are performed by a mesh edge process 135 on a mesh edge node, such as a wireless end node like device 131 or a wireless roof top access point, RAP 125. Steps 440, 450 and 460 are performed by a backhaul conversion process 150 on a backhaul node, such as MAP 121a, that receives a wireless data packet from a mesh edge node. In some embodiments, one or more of steps 410 and 420 are also performed by the backhaul conversion process 150.

In step 410, a maximum hop time is determined. This time is represented herein by the symbol aSlot. Any method may be used to determine this time. It may be calculated or measured or input manually or from a data file. In some embodiments aSlot is determined in order to determine appropriate wait time parameters such as AIFS and SIFS for the various priority queues, as described in more detail below. A data packet is transmitted at the speed of light between nodes. A data packet traversing from a MAP (e.g., MAP 121b) to the wireless rooftop access point (e.g., RAP 125) may take several hops that are not aligned, so the distance the data packet travels is, in general, not a straight line from the MAP to the roof top access point. An example path is shown in FIG. 1 as a dotted line from MAP 121b to RAP 125 through MAP 122b, MAP 123c, MAP 124b, and MAP 124a, in sequence. The travel time for each hop along this path is the distance between the nodes being hopped divided by the speed of light. Then aSlot is the maximum of all the hop travel times in the backhaul 120.

In step 420, wait time parameters are configured for multiple priorities, such as the four priorities associated with the four priority queues allowed under the standard 802.11. Wait times are shorter for higher priority queues. In the illustrated embodiment, the wait time parameters for the highest priority queue are based on aSlot.

According to the 802.11 standard, as is well known, a wireless node can attempt to send a data packet from a queue when the channel is clear for an amount of time that is longer than the AIFS time for that queue by a short random amount up to a maximum for the queue. The short random amount is added to AIFS to reduce the likelihood that two wireless nodes attempt to transmit at the same time. Another configured parameter, called the contention window (CW) size sets the maximum value for the random time added to AIFS. Thus, for each queue, a node can transmit after a time that falls in an interval between AIFS and AIFS+CW. To indicate that the transmission was successful, the receiving node sends a very short acknowledgement data packet (ACK packet) on the same channel within the SIFS time. The ACK packet is indicated by the type field in the 802.11 header. SIFS is shorter than AIFS to ensure that another data packet is not transmitted before an ACK packet is received. The reception of an ACK packet within the SIFS time is sufficient proof of a successful transmission because the ACK packet is unicast to the transmitting node.

According to some embodiment of the invention, the AIFS, CW and SIFS parameters values are shorter for a data packet on the backhaul than a similar packet on the edge of the backhaul. In some of these embodiments, the AIFS, CW and SIFS parameter values are determined so that the data packet has a high probability of traversing the entire backhaul before any other data packet is allowed access to the channel.

In an illustrated embodiment two of the four 802.11 priority queues are associated with high quality of service data packets, such as real time data packets used for digital telephony. One of the two high priority queues is a highest priority queue, and is used only for data packets on the backhaul, and the second of the two high priority queues is a second highest priority queue, and is used only outside the backhaul. Similarly, the remaining two of the four 802.11 priority queues are associated with low quality of service data packets, such as best reasonable effort data packets used for email, web pages, and file transfer. One of the two low priority queues is a $3^{rd}$ highest priority queue, and is used only for best effort data packets on the backhaul, and the second of the two low priority queues is a $4^{th}$ highest priority queue, and is used only for best effort data packets outside the backhaul. The four priorities from highest to lowest are designated herein P0, P1, P2, P3.

In this embodiment, the AIFS for the highest priority queue (e.g., for real time data packets) is equal to the maximum hop time, aSlot, to ensure that no node attempts to use the channel until the highest priority data packet already accepted has had time to transmit to the next node. CW is an integral multiple of aSlot.

In this embodiment, AIFS for the second priority queue is long enough so that no packet on the mesh edge enters the backhaul until the backhaul node has emptied its highest priority queue. This is accomplished by setting AIFS larger than AIFS+CW for the higher priority queue. Thus data packets on the edge wait there until higher priority queues in the backhaul are emptied. In other embodiments, AIFS for the second priority queue are longer than AIFS for the first priority but not as long as AIFS+CW for the first priority. An appropriate value for AIFS of the second priority queue can be determined for a particular mesh network by experiment. Similar constraints are placed on the high and low priority queues for the best effort data packets. Table 1 lists the wait time parameters according to an illustrated embodiment for the four priority queues allowed under the 802.11 standard.

TABLE 1

Wait parameter values for four priority queues in an illustrated embodiment.

| Priority | Wait parameter | value | Wait parameter | value | minimum wait | maximum wait |
|---|---|---|---|---|---|---|
| P0 | AIFS0 | aSlot | CW0 | 3 aSlot | aSlot | 4 aSlot |
| P1 | AIFS1 | AIFS0 + 4 aSlot | CW1 | 3 aSlot | 5 aSlot | 8 aSlot |
| P2 | AIFS2 | AIFS1 + 4 aSlot | CW2 | 4 aSlot | 9 aSlot | 13 aSlot |
| P3 | AIFS1 | AIFS2 + 5 aSlot | CW3 | 4 aSlot | 14 aSlot | 18 aSlot |

In the illustrated embodiment, P0 is used for real time data packets on the wireless mesh backhaul, P1 for real time data packets on mesh edge nodes, P2 for best effort packets on the backhaul, and P3 for the best effort packets on mesh edge nodes.

In step 430, a mesh edge node, originates a wireless data packet, assigns it a lower priority of the priorities for the data type (e.g., real time or best effort) and transmits it. For example, at device 131 or RAP 125, a data packet to take its next hop over a wireless link to a backhaul node is assigned a lower priority, and put in the appropriate queue until the channel is clear for a wait time computed from the associated wait time parameter values. If the data packet is a real time data packet, then it is placed in the P1 priority queue (the lower priority of queues P0 and P1 for real time data packets). If the data packet is best effort data packet, then it is placed in the P3 priority queue (the lower priority of queues P2 and P3 for best effort data packets).

In step 440, a sent data packet sent by a mesh edge node is received on the backhaul node 121 and converted to higher priority. For example, a real time data packet is received at MAP 121b from device 131; and MAP 121b converts the priority using the backhaul conversion process. If the data packet is a real time data packet, then it is converted to a P0 priority and placed in the P0 priority queue 332 (the higher priority of queues P0 and P1 for real time data packets). If the data packet is best effort data packet, then it is converted to a P2 priority and placed in the P2 priority queue 336 (the higher priority of queues P2 and P3 for best effort data packets).

As described here, a wireless data packet received from another mesh backhaul node is treated differently than one received from a wireless node outside the mesh backhaul. In some embodiments a wireless data packet can be differentiated as originating within the mesh backhaul or outside based on conventional information in the data packet itself. A mesh frame is an 802.11 data frame using all four addresses in a MAC header: Source Address (SA) and Destination Address (DA) which are used end-to-end; and Transmitter Address (TA) and Receiver Address (RA) which are updated at each hop. In some embodiments, a special identifier is added in the payload and that identifier used to recognize a mesh backhaul packet.

In step 450, the backhaul node 121 transmits a forwarded data packet based on the sent data packet after the channel is clear for a wait time computed from the associated wait time parameter values. The forwarded data packet may be the same as the sent data packet, but often is different in that the forwarded data packet has a different priority. The forwarded packet may differ in some other ways. Since the wait time is shorter for the higher priority queues, forwarded data packets in a backhaul node always occupy a higher priority queue than the same type outside the backhaul. Therefore forwarded data packets are always transmitted before data packets of the same type are sent to the backhaul node from an adjacent mesh edge node. Thus the queues grow on the edge nodes until the backhaul node clears its queues of the same type or higher priority type. For example, the backhaul node empties its real time queue (P0) before an adjacent mesh edge node is allowed to transmit a real time packet (P1) or best effort data packet (P3). Similarly, the backhaul node empties its best effort queue (P2) before an adjacent mesh edge node is allowed to transmit a best effort data packet (P3). However, with the values in Table 1, the mesh edge node is able to transmit a real time data packet (P1) before the backhaul node transmits a best effort data packet from its best effort queue (P2).

According to some embodiments of the invention, an ACK packet is not sent by a backhaul node during step 450. An advantage of this embodiment is that the backhaul node need not wait the SIFS time plus the time to send the ACK data packet in addition to the wait time based on AIFS. The backhaul node need only wait the wait time based on AIFS. The extra wait is SIFS+an ACK data packet transmit time for each backhaul node in the path. Thus the delays accumulate on the order of $N*(SIFS+T_{ACK})$ where $T_{ACK}$ is the time to send the ACK data packet and N is the number of backhaul nodes in the path between mesh edge nodes.

Furthermore, by introducing a SIFS, in some embodiments, AIFS0 is increased above aSlot, because SIFS is set equal to aSlot and AIFS0 is longer than SIFS in such embodiments. An example of the wait time parameter values in embodiments that set SIFS based on aSlot is given in Table 2. As can be seen in Table 2, by sending an ACK data packet the wait times for each priority queue increases, thus decreasing the average throughput of the network.

TABLE 2

Wait parameter values with a SIFS set to aSlot for ACK data packets.

| Priority | Wait parameter | value | Wait parameter | value | minimum wait | maximum wait |
|---|---|---|---|---|---|---|
| All | SIFS | aSlot | CWack | aSlot | aSlot | 2 aSlot |
| P0 | AIFS0 | 3 aSlot | CW0 | 3 aSlot | 3 aSlot | 6 aSlot |
| P1 | AIFS1 | AIFS0 + 4 aSlot | CW1 | 3 aSlot | 7 aSlot | 10 aSlot |
| P2 | AIFS2 | AIFS1 + 4 aSlot | CW2 | 4 aSlot | 11 aSlot | 15 aSlot |
| P3 | AIFS1 | AIFS2 + 5 aSlot | CW3 | 4 aSlot | 16 aSlot | 20 aSlot |

In embodiments without ACK data packets on backhaul forwarding, SIFS is set equal to the maximum wait for the highest priority of each type, i.e. AIFS0+CW0 for P0, and is shorter than the minimum wait for the lower priority of each type. Example values for SIFS when there is no explicit ACK data packet during backhaul forwarding are given in Table 3

TABLE 3

Wait parameter values with no ACK data packet.

| Priority | Wait parameter | value | Wait parameter | value | mini wait | max wait | SIFS | value |
|---|---|---|---|---|---|---|---|---|
| P0 | AIFS0 | aSlot | CW0 | 3 aSlot | aSlot | 4 aSlot | SIFS0 | 4 aSlot |
| P1 | AIFS1 | AIFS0 + 4 | CW1 | 3 aSlot | 5 aSlot | 8 aSlot | SIFS1 | 4 aSlot |
| P2 | AIFS2 | AIFS1 + 4 | CW2 | 4 aSlot | 9 aSlot | 13 aSlot | SIFS2 | 13 aSlot |
| P3 | AIFS1 | AIFS2 + 5 | CW3 | 4 aSlot | 14 aSlot | 18 aSlot | SIFS3 | 13 aSlot |

In step 460, for embodiments that eliminate an ACK data packet, the forwarded data packet is interpreted, as is an ACK data packet, to indicate that the sent data packet has been received by the backhaul node. In embodiments in which the ACK data packet is not eliminated on the backhaul, step 460 is omitted. More detail on step 460 is provided below with reference to FIG. 5C.

Example Method at Mesh Edge Node that Generates Wireless Packet

Figure 5A:
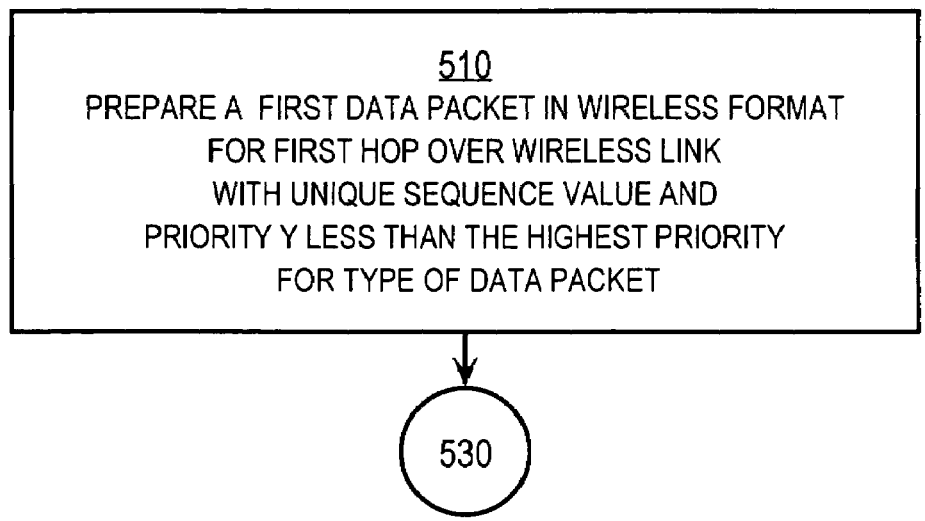
FIG. 5A illustrates an example method for assigning a priority to a wireless data packet generated at a wireless node.

FIG. 5A illustrates an example method for assigning a priority to a data packet at a mesh edge node, according to an embodiment. In step 510, a data packet is prepared for sending over its first wireless hop by assigning it a priority less than the highest priority for its type. For example, in the illustrated embodiment, a real time data packet is assigned a priority of P1 and placed in the P1 priority queue 334. Similarly, a best effort data packet is assigned a priority of P3 and placed in the P3 priority queue 338.

In some embodiments, step 510 includes inserting a unique sequence value in the data packet for the hop, e.g., into a portion of payload 228 reserved for that purpose. The unique sequence number is used to identify the packet when it is forwarded by a backhaul node in embodiment in which the backhaul does not send ACK data packets. For example, in some embodiments, the unique sequence value is generated by performing a one-way hash on the contents of the data packet, e.g., an eight bit hash on the payload 226. The use of the sequence value is described in more detail below with reference to step 580 of FIG. 5C.

Control then passes to method 530 depicted in FIG. 5C, and described in more detail in a later section. In the illustrated embodiment, step 510 and method 530 are performed by mesh edge process 135.

Example Method at Forwarding Mesh Backhaul Node

Figure 5B:
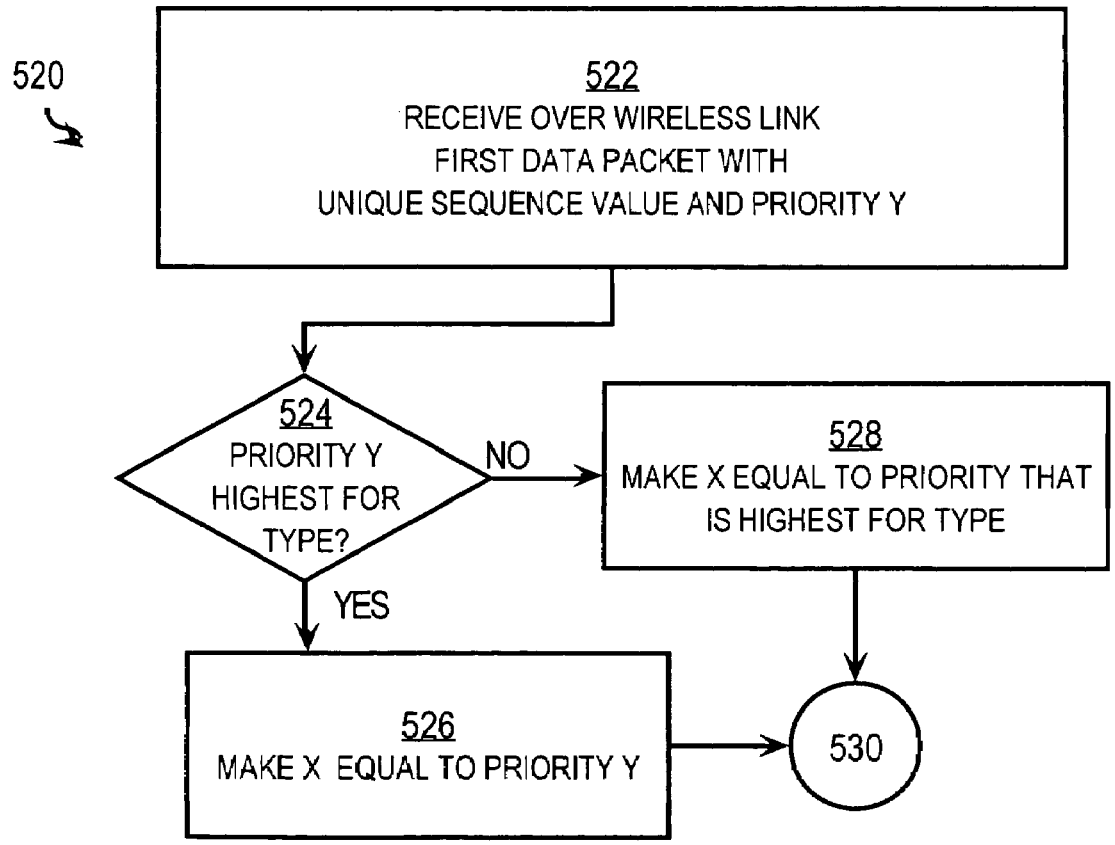
FIG. 5B illustrates an example method for assigning a priority to a wireless data packet forwarded at a wireless intermediate node.

FIG. 5B illustrates an example method 520 for assigning a priority to a data packet forwarded at a wireless access node on the wireless backhaul. Method 520 includes steps 522, 524, 526 and 528.

In step 522 a sent data packet is received over a wireless link with a particular priority (designated received priority Y). The data packet may be received from a mesh edge node or another backhaul node that is not on the edge. In some embodiments, the data packet includes a unique sequence value as described above with reference to step 510.

In step 524, it is determined whether the particular priority Y is the highest for the type. For example, in the illustrated embodiment, if the type is a real time data packet, then it is determined whether the priority is P0, the highest priority for the real time data packet type. If the type is a best effort data packet, then it is determined whether the priority is P2, the highest priority for the best effort data packet type. If so, then control passes to step 526. In step 526 the priority on the current node, designated by the current priority X, is set to be the same as the particular received priority Y. In this case, the data packet has been sent by another backhaul node away from the mesh edge. Control then passes to method 530 depicted in FIG. 5C, and described in more detail in a later section.

However, if it determined in step 524 that the particular priority Y is not the highest for the type, then it is determined that the data packet was sent from a mesh edge node, and control passes to step 528. For example, in the illustrated embodiment, if the received priority Y is P1 (the lower priority for real time data packets) control passes to step 528. Similarly, if the received priority Y is P3 (the lower priority for best effort data packets) control passes to step 528.

In step 528, the priority is converted to equal the highest priority for the data packet type. For example, current priority X is set to the highest priority for the type. For example, in the illustrated embodiment, if the received priority Y is P1 (the lower priority for real time data packets), then current priority X is set to P0 (the highest priority for real time data packets). Similarly, if the received priority Y is P3 (the lower priority for best effort data packets), then current priority X is set to P2 (the highest priority for best effort data packets). Control then passes to method 530 depicted in FIG. 5C.

In the illustrated embodiment, method 520 and method 530 are performed by backhaul conversion process 150.

Example Method for Transmitting without Acknowledgement

Figure 5C:
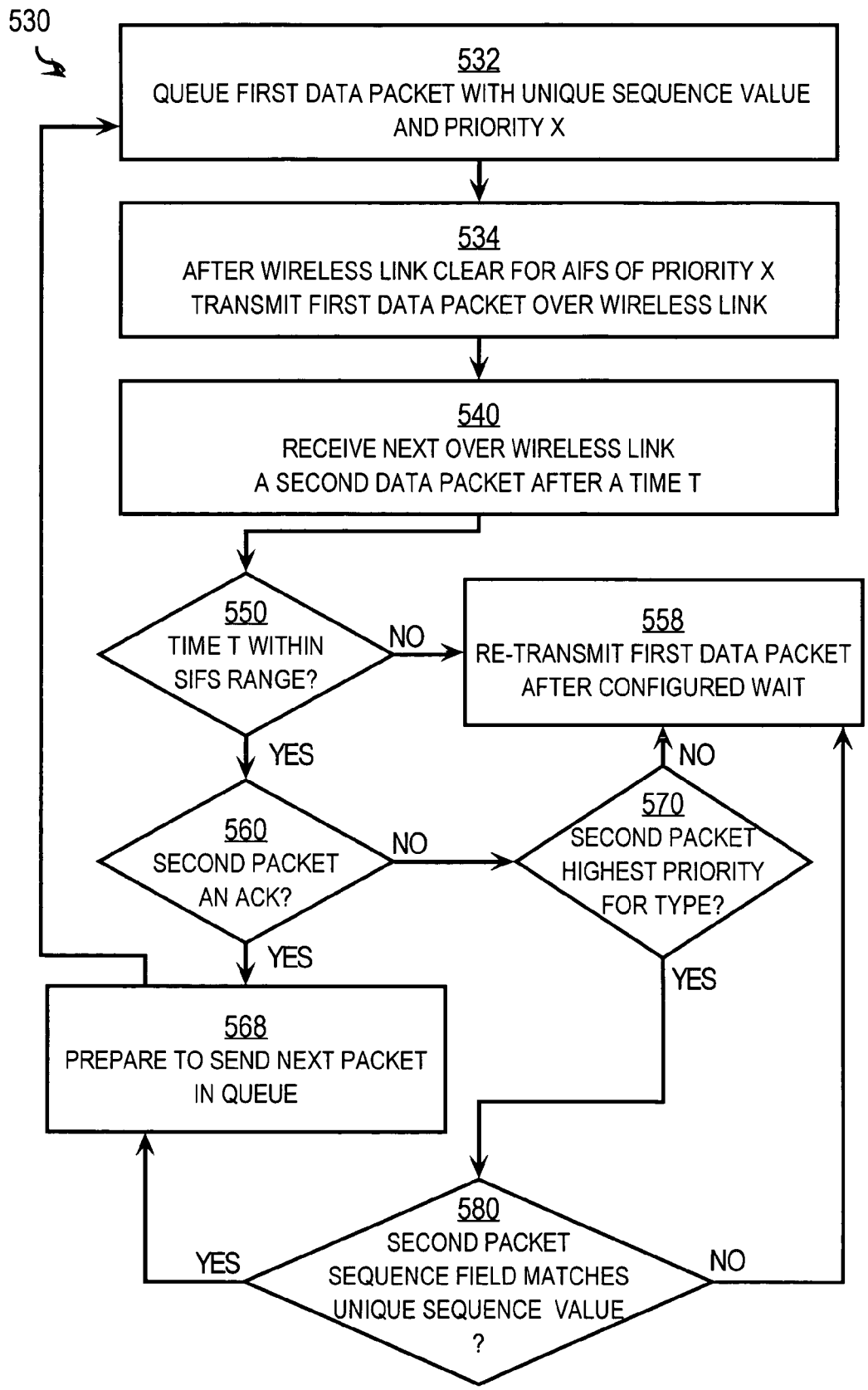
FIG. 5C illustrates an example method for transmitting a wireless data packet from a queue at a wireless mesh node.

FIG. 5C illustrates an example method 530 for transmitting a data packet from a queue at any wireless mesh node.

In step 532, a data packet is placed in a queue based on its priority. The data packet priority is set by the generating mesh edge node in step 510 described above with reference to FIG. 5A, or by a forwarding mesh backhaul node in steps 524, 526 and 528 described above with reference to FIG. 5B. In the illustrated embodiment, the data packet includes a unique sequence value.

In step 534, the data packet rises to the top of the queue and is transmitted after the wireless link is clear for a wait time that is calculated based on the AIFS associated with the queue. For example, in the illustrated embodiment, if the data packet is in P0 priority queue 332, it is associated with AIFS0 and CW0. The data packet is transmitted at a random time in a time interval between aSlot and 4 aSlot, as indicated in Table 3. Note that in the illustrated embodiment, this priority P0 only occurs on a forwarding backhaul node for a real time data packet and not on a mesh edge node generating a real time packet. For example, in the illustrated embodiment, if the data packet is in P1 priority queue 334, it is associated with AIFS1 and is transmitted at a random time in a time interval between 5 aSlot and 8 aSlot, as indicated in Table 1. Note that in the illustrated embodiment, this priority P1 only occurs on a mesh edge node generating a real time packet and not on a backhaul node forwarding a real time packet. Similar statements hold for priority P2 queue 336 and priority P3 queue 338 for best effort data packets inside and outside backhaul forwarding.

In step 540, the next data packet on the wireless link is received after a particular time T at the node that just transmitted. In the next steps it is determined whether the received data packet indicates a successful transmission to an adjacent mesh node or a failure that warrants a re-transmission of the data packet transmitted during step 534. This determination is made whether or not the adjacent node sends an ACK data packet.

In step 540 it is determined whether the time T is within the SIFS range. In embodiments with an ACK data packet for all priorities, this test is the same as performed conventionally. In embodiments with no ACK data packet for at least one priority, SIFS is a function of the priority. For the illustrated embodiment, with ACKs on the edge but not in the backhaul, the SIFS are as indicated in Table 3. In the illustrated embodiment, the SIFS for a type of data packet is equal to the maximum wait time for the highest priority of that type. A forwarded data packet by the adjacent node will be received by the current mesh node within that time and can serve as a de facto ACK.

If it is determined, in step 550, that T is not within the SIFS range for the priority queue, then something is wrong. Control passes to step 559. In step 559 the data packet transmitted during step 534 is transmitted again after the channel is clear for a wait interval based on configured values for re-transmission.

If it is determined, in step 550, that T is within the SIFS range for the priority queue, then the data packet received during step 540 might indicate that the packet transmitted during step 534 was in fact received by the adjacent node. Control passes to step 560.

In step 560, it is determined whether the received packet is an ACK data packet. If so, then receipt by the adjacent node of the packet transmitted during step 534 is confirmed. Control passes to step 568. In step 568, preparations are made to send the next packet in the queue. Control passes back to step 532 to queue any new packets by priority.

If it is determined, in step 560, that the received packet is not an ACK data packet, then control passes to step 570. In step 570, it is determined whether the second packet received during step 540 has the highest priority for the type. If so, then the packet received is a packet forwarded by the backhaul instead of sending an ACK packet. If not, then the packet received is not a forwarded packet and something is wrong; and, control then passes to step 558 to re-transmit. For example, if the data packet transmitted during step 534 is a real time data packet, then it is determined in step 570 whether the priority of the data packet received in step 540 is priority P0 (the highest priority for real time data packets). This is the desired conditions whether the data packet transmitted during step 534 has priority P1 or P0. Similarly, if the data packet transmitted during step 534 is a best effort data packet, then it is determined in step 570 whether the priority of the data packet received in step 540 is priority P2 (the highest priority for best effort data packets).

If it is determined, in step 570, that the second packet received during step 540 has the highest priority for the type, then the received data packet is a data packet forwarded by the backhaul. Control passes to step 580. In step 580, it is determined whether, the packet forwarded is the same packet transmitted during step 534, by determining whether the sequence value in the data packet received during step 540 matches the sequence number in the data packet transmitted during step 534. If so, then the transmitted packet was received and forwarded by the adjacent node and control passes to step 568 to begin processing the next packet in the queue.

The methods 400, 510, 520 and 530 together reduce delays on the backhaul by eliminating ACK packets on the backhaul. These methods also ensure a data packet on the backhaul will clear the backhaul before accepting another data packet by selecting a minimum AIFS no less than aSlot. Furthermore, these methods cause excess data packets to queue up on the edges where they do not interfere with forwarding by the backhaul by changing priority as packets enter the backhaul to give the shortest waits for any data type to data packets on the backhaul. Thus catastrophic failures are avoided and average content throughput is improved.

Example Hardware Implementation

Figure 6:
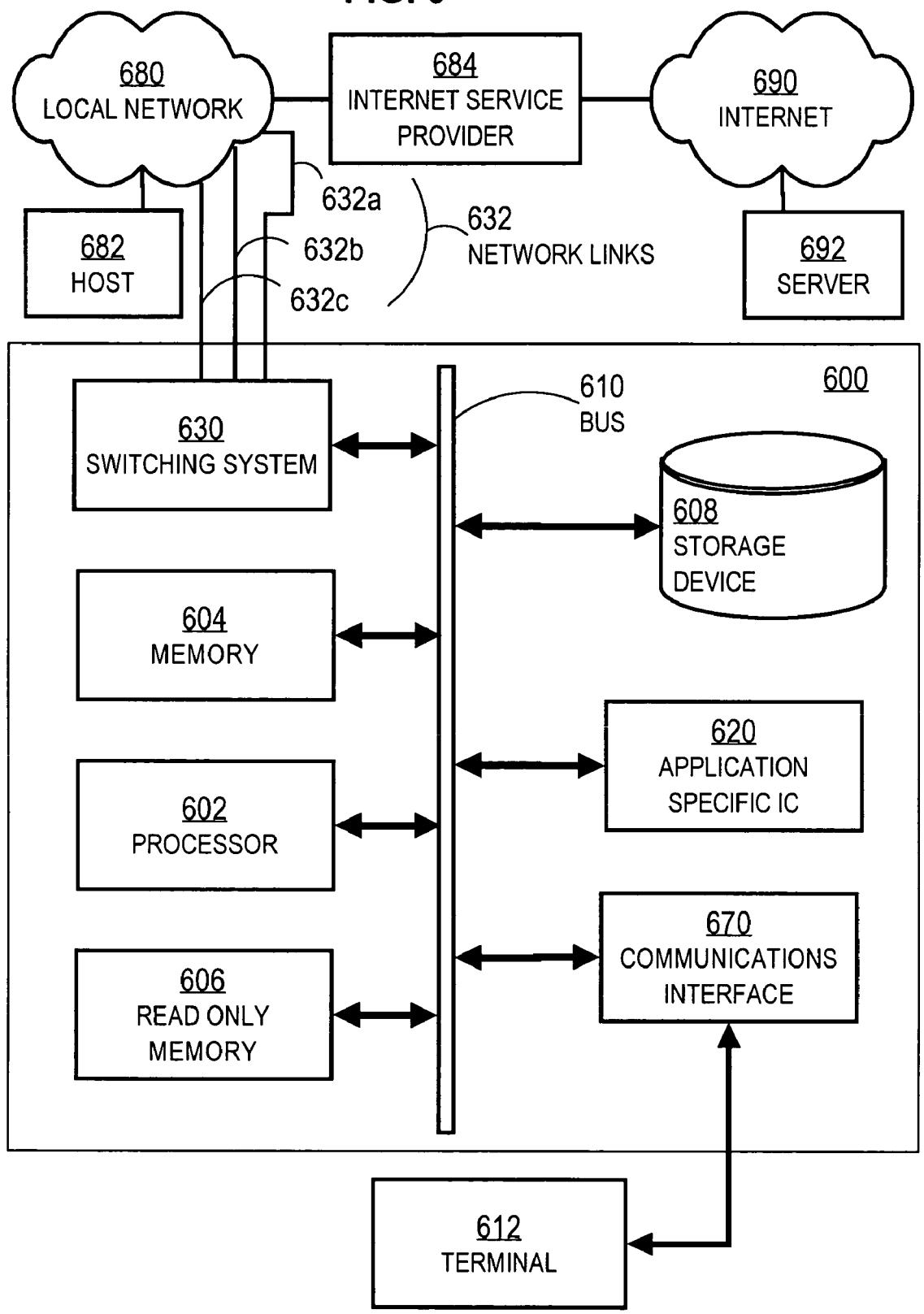
FIG. 6 illustrates an example computer system.

FIG. 6 illustrates an example computer system 600 upon which an embodiment of the invention may be implemented. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), for presenting images, and a pointing device 616, such as a mouse or a trackball or cursor direction keys, for controlling a position of a small cursor image presented on the display 614 and issuing commands associated with graphical elements presented on the display 614.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 678 typically provides information communication through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides information representing video data for presentation at display 614.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620, may be used in place of or in combination with software to implement the invention. Thus, embodiments of the invention are not limited to any specific combination of hardware and software.

The signals transmitted over network link 678 and other networks through communications interface 670, which carry information to and from computer system 600, are exemplary forms of carrier waves. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 602 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving, over a wireless link at a wireless intermediate network node of a wireless mesh network, a first data packet that includes data that indicates that the first data packet was transmitted by a first sending node that is outside of a mesh backhaul, the first sending node being a wireless end node connected by a wire to a wired subnetwork, wherein the first data packet is associated with first configured values for a first minimum wait interval and a first maximum wait interval for reducing contention for the wireless link;
receiving, after receiving the first data packet, over the wireless link at the wireless intermediate network node of the wireless mesh network, a second data packet that includes data that indicates that the second data packet was transmitted by a second sending node that is inside the mesh backhaul;
identifying the second data packet as a best effort packet or a real time packet;
converting, if the second data packet is the real time packet, a priority of the second data packet to a first priority higher than a priority of the first data packet, wherein the conversion is based on the second data packet being received from inside the mesh backhaul and the first data packet being received from outside the mesh backhaul, wherein the conversion of the priority of the second data packet to the first priority is independent of a destination of the second data packet;

converting, if the second data packet is the best effort packet, the priority of the second data packet to a second priority lower than the first priority and higher than the priority of the first data packet, wherein the conversion of the priority of the second data packet to the second priority is independent of the destination of the second data packet; and transmitting over the wireless link the second data packet prior to transmitting the first data packet based on the priority of the second data packet being higher than the priority of the first data packet, wherein the second data packet is associated with second configured values for a different second minimum wait interval and a different second maximum wait interval for reducing contention for the wireless link, and wherein the first minimum wait interval is set larger than the second minimum wait interval such that the second data packet clears the mesh backhaul before the first data packet is transmitted.

2. A method as recited in claim 1, wherein the first minimum wait interval is greater than the second maximum wait interval.

3. A method as recited in claim 1, wherein:
the method further comprises determining a maximum hop time for a data packet to hop to an adjacent intermediate network node in the wireless mesh network; and
the second minimum wait interval is not less than the maximum hop time.

4. A method as recited in claim 3, wherein the second minimum wait interval is substantively equal to the maximum hop time.

5. A method as recited in claim 1, wherein:
the first data packet is formatted as a frame of Institute of Electrical and Electronics Engineers (IEEE) standard 802.11;
the IEEE 802.11 frame includes a priority queue field to indicate a particular queue of a plurality of priority queues;
a first queue of the plurality of priority queues is associated with the first configured values; and
the data that indicates that the first data packet is associated with the first configured values is data in the priority queue field of the first data packet that indicates the first queue.

6. A method as recited in claim 5, wherein:
the second data packet is formatted as a frame of IEEE standard 802.11;
a different second queue of the plurality of priority queues is associated with the second configured values; and
transmitting the second data packet further comprising inserting data that indicates the second queue in the priority queue field of the second data packet.

7. A method as recited in claim 1, wherein the second maximum wait interval is equal to a maximum wait interval for sending an acknowledgement data packet, and transmitting the second data packet is performed instead of transmitting an acknowledgment data packet.

8. A method as recited in claim 7, wherein the second data packet includes data from the first data packet that uniquely identifies the first data packet to the sending node, and transmitting the second data packet has an effect substantively equivalent to transmitting an acknowledgement data packet.

9. The method of claim 1, wherein a plurality of packets include the first packet and the plurality of packets accumulate at the wireless intermediate network node during the first minimum wait interval.

10. An apparatus comprising:
a wireless network interface that is in wireless communication with a packet-switched network for communicating a data packet;
one or more processors;
a computer-readable medium; and
one or more sequences of instructions stored in the computer-readable medium, which, when executed by the one or more processors, causes the one or more processors to:
receive, over the wireless network interface, a first data packet that includes data that indicates that the first data packet was transmitted by a sending node that is outside of a mesh backhaul, wherein the first data packet is associated with first configured values for a first minimum wait interval and a first maximum wait interval for reducing contention for the wireless network interface;
convert a priority of a second data packet to a higher priority than a priority of the first data packet based on the second data packet being received from inside the mesh backhaul and the first data packet being received from outside the mesh backhaul wherein the conversion of the priority of the second data packet is independent of a destination of the second data packet; and
transmit over the wireless network interface the second data packet based on second configured values for a different second minimum wait interval and a different second maximum wait interval for reducing contention for the wireless network interface,
wherein the first minimum wait interval is set greater than the second minimum wait interval such that the second data packet exits the mesh backhaul before the first data packet is transmitted by the wireless network interface.

11. An apparatus as recited in claim 10, wherein the first minimum wait interval is greater than the second maximum wait interval.

12. An apparatus as recited in claim 10, wherein:
execution of the one or more sequences of instructions further causes the one or more processors to carry out the step of determining a maximum hop time for a data packet to hop to an adjacent intermediate network node in the wireless mesh network; and
the second minimum wait interval is not less than the maximum hop time.

13. An apparatus as recited in claim 12, wherein the second minimum wait interval is substantively equal to the maximum hop time.

14. A method comprising:
receiving, over a wireless link at a wireless intermediate network node of a wireless mesh network, a first data packet that includes data that indicates whether the first data packet was transmitted by a sending node that is outside of a mesh backhaul of the wireless mesh network or inside of the mesh backhaul;
converting a priority of the first data packet based on whether the first data packet was transmitted from outside of the mesh backhaul of the wireless mesh network or inside of the mesh backhaul, wherein the first data packet is given a higher priority if the first data packet is from inside of the mesh backhaul and given a lower priority if the first data packet is from outside of the mesh backhaul wherein the conversion of the priority of the first data packet is independent of a destination of the first data packet;

transmitting the first data packet based on the higher priority;

receiving a plurality of data packets of the lower priority at the wireless intermediate network node, wherein the plurality of data packets of the lower priority accumulate in a queue until the first data packet clears the mesh backhaul; and transmitting at least one of the plurality of data packets of the lower plurality when the first data packet clears the mesh backhaul.

15. A network device for forwarding packets over a wireless mesh network including mesh edge nodes and a mesh backhaul of backhaul nodes comprising:

a wireless network interface configured to receive a data packet queued at an ingress of the wireless mesh network, wherein the data packet includes data indicating the data packet was transmitted by a type of sending node and data indicating a type of the data packet;

a controller configured to determine whether the type of the data packet is a best effort packet or a real time packet and configured to determine whether the type of sending node is a mesh edge node or a backhaul node;

wherein, in response to the type of the data packet being the best effort packet and the type of sending node being the backhaul node, the controller is configured to convert a first priority of the data packet at the ingress of the wireless mesh network to a second priority and conversion of the first priority of the data packet is independent of a destination of the data packet, wherein, in response to the type of the data packet being the real time packet and the type of sending node being the backhaul node, the controller is configured to convert a third priority of the data packet at the ingress of the wireless mesh network to a fourth priority and conversion of the third priority of the data packet is independent of a destination of the data packet, wherein, in response to the type of the data packet being the best effort packet and the type of sending node being the mesh edge node, the controller is configured to place the data packet in a queue assigned to the first priority, wherein, in response to the type of the data packet being the real time packet and the type of sending node being the mesh edge node, the controller is configured to place the data packet in a queue assigned to the third priority, wherein the controller is configured to set a wait interval of the fourth priority is lower than a wait interval of the third priority, the wait interval of the third priority lower than a wait interval of the second priority, and the wait interval of the second priority lower than a wait interval of the first priority, such that packets of the first priority and the second priority exit the mesh backhaul before packets of the third priority and the fourth priority are released into the mesh backhaul.

16. The network device of claim 15, wherein real time packets support voice telephony, video conferencing, or gaming and best effort packets support email, websites, or file transfer.

* * * * *